United States Patent
Knoblich et al.

(10) Patent No.: US 12,061,330 B2
(45) Date of Patent: Aug. 13, 2024

(54) IMMERSION MEDIUM APPLICATION BY MEANS OF AN INJECTION NOZZLE

(71) Applicant: Carl Zeiss Microscopy GmbH, Jena (DE)

(72) Inventors: Johannes Knoblich, Jena (DE); Daniel Harangozo, Gauting (DE); Hendrik Herrmann, Bernried (DE); Robert Fessler, Krickenbach (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 638 days.

(21) Appl. No.: 17/288,475

(22) PCT Filed: Oct. 17, 2019

(86) PCT No.: PCT/EP2019/078257
§ 371 (c)(1),
(2) Date: Apr. 23, 2021

(87) PCT Pub. No.: WO2020/083747
PCT Pub. Date: Apr. 30, 2020

(65) Prior Publication Data
US 2021/0389578 A1  Dec. 16, 2021

(30) Foreign Application Priority Data
Oct. 24, 2018 (DE) .................. 102018126526.3

(51) Int. Cl.
*G02B 21/33* (2006.01)
*G02B 21/24* (2006.01)

(52) U.S. Cl.
CPC ............ *G02B 21/33* (2013.01); *G02B 21/24* (2013.01)

(58) Field of Classification Search
CPC .................................................. G02B 21/00
See application file for complete search history.

(56) References Cited

U.S. PATENT DOCUMENTS

| 1,891,348 A | 12/1932 | Ellinger et al. |
| 7,532,393 B2 | 12/2009 | Berns et al. |

(Continued)

FOREIGN PATENT DOCUMENTS

| DE | 10123027 B4 | 7/2005 |
| DE | 10333326 B4 | 3/2007 |

(Continued)

OTHER PUBLICATIONS

International Search Report and Written Opinion for PCT/EP2019/078257 in German, mailed Jan. 16, 2020 (13 pgs).

(Continued)

*Primary Examiner* — Robert E. Tallman
(74) *Attorney, Agent, or Firm* — Bradley J. Thorson

(57) ABSTRACT

The invention relates to a microscope, having: a specimen chamber for a specimen (2, 20); at least one microscope objective (1); one motor driven objective changer (32), which, for the purposes of changing a microscope objective, moves the least one microscope objective (1) through a change volume (34); a control device (20) controlling the objective changer (32); and an apparatus for applying a liquid immersion agent into a gap (6) between the microscope objective (1) and a specimen (2, 20) received in the specimen chamber, said apparatus having a jet device (4) which is designed to introduce the immersion agent in a jet (5) laterally into the gap (6), the jet device (4) having an operating position (B) for laterally introducing the immersion agent into the gap (6), in which position the jet device (4) is located in the change volume (34), the jet device (4) is coupled to a drive (28) for adjusting the location of the jet device (4), and the control device (20) is connected to and configured for control of the drive (28) in order to control the drive (28) in preparation for the microscope objective change such that said drive moves the jet device (4) into a (Continued)

parking position (P), in which the jet device (4) clears the change volume (34), then to control the objective changer (32) to change the microscope objective and subsequently to actuate the drive (28) so that said drive brings the jet device (4) into the operating position (B).

15 Claims, 2 Drawing Sheets

(56) References Cited

U.S. PATENT DOCUMENTS

| | | | |
|---|---|---|---|
| 2004/0263961 | A1 | 12/2004 | Hummel |
| 2005/0063046 | A1 | 3/2005 | Arata et al. |
| 2005/0094258 | A1 | 5/2005 | Tanabe et al. |
| 2005/0094293 | A1 | 5/2005 | Tanabe et al. |
| 2006/0238885 | A1 | 10/2006 | Hasegawa et al. |
| 2006/0274406 | A1 | 12/2006 | Maass |
| 2007/0047093 | A1 | 3/2007 | Hoering et al. |
| 2007/0127134 | A1 | 6/2007 | Corbett |
| 2007/0291360 | A1 | 12/2007 | Pirsch |
| 2007/0291361 | A1 | 12/2007 | Lee |
| 2008/0252967 | A1 | 10/2008 | Tomioka et al. |
| 2008/0259327 | A1* | 10/2008 | Brueck ............... G03F 7/70341 359/392 |
| 2009/0109416 | A1 | 4/2009 | Dougherty et al. |
| 2010/0027109 | A1 | 2/2010 | Liebel et al. |
| 2010/0110540 | A1 | 5/2010 | Niv et al. |
| 2012/0104119 | A1 | 5/2012 | Benalikhoudja |
| 2015/0015942 | A1 | 1/2015 | Steinmeyer et al. |
| 2015/0015943 | A1 | 1/2015 | Scheps et al. |
| 2015/0212310 | A1 | 7/2015 | Fukuda et al. |
| 2015/0260975 | A1 | 9/2015 | Schoen et al. |
| 2016/0334611 | A1 | 11/2016 | Herrmann et al. |
| 2018/0052314 | A1 | 2/2018 | Brinkman et al. |

FOREIGN PATENT DOCUMENTS

| | | |
|---|---|---|
| DE | 102005040828 A1 | 3/2007 |
| DE | 102006042499 A1 | 3/2008 |
| DE | 102009044413 A1 | 5/2010 |
| DE | 102013011543 A1 | 1/2015 |
| DE | 102013011544 A1 | 1/2015 |
| DE | 102014003684 A1 | 9/2015 |
| DE | 202015105900 U1 | 12/2015 |
| DE | 102015200927 A1 | 7/2016 |
| DE | 202017000475 U1 | 3/2017 |
| EP | 1717630 A1 | 4/2006 |
| EP | 1870752 A1 | 6/2007 |
| EP | 1980892 B1 | 4/2008 |
| EP | 2905646 A1 | 1/2015 |
| GB | 353340 A | 7/1931 |
| WO | 2002093232 A2 | 11/2002 |
| WO | 2006005703 A1 | 1/2006 |
| WO | 2018138053 A1 | 8/2018 |

OTHER PUBLICATIONS

International Preliminary Report on Patentability for PCT/EP2019/078257, English translation, mailed May 6, 2021 (16 pgs).

* cited by examiner

IMMERSION MEDIUM APPLICATION BY MEANS OF AN INJECTION NOZZLE

RELATED APPLICATIONS

The present application claims priority to PCT Application No. PCT/EP2019/078257, entitled IMMERSION MEDIUM APPLICATION BY MEANS OF AN INJECTION NOZZLE, filed Oct. 17, 2019, and claims the benefit of German Application No. 10 2018 126 526.3, filed Oct. 24, 2018, which are both hereby incorporated herein by reference in their entirety.

FIELD OF THE INVENTION

The invention relates to an apparatus for applying a liquid immersion medium into a clearance between a microscope objective and a sample to be examined, wherein the apparatus comprises an injection device, which is configured to introduce the immersion medium in form of a jet laterally into the clearance, and a motor-driven objective changer, which moves the microscope objective through a change volume when a microscope objective is exchanged.

The invention further relates to a method for applying a liquid immersion medium into a clearance between a microscope objective and a sample to be examined, wherein the immersion medium is introduced laterally in form of a jet laterally into the clearance and a motor-driven objective changer is used for exchanging the microscope objective, which changer moves the microscope objective through a change volume when the microscope objective is exchanged.

DESCRIPTION OF THE RELATED ART

In microscopy it is common to use liquid immersion media, for example water or oil based, to increase resolution. The application of such liquid immersion medium into a clearance between a microscope objective and a sample to be examined is described in a large number of publications, for example in DE 102013011543 A1, DE 102013011544 A1, DE 102014003684 A1, DE 102005040828 A1, U.S. Pat. No. 7,532,393 B2, EP 2905646 A1, DE 102006042499 A1, EP 1980892 B1, US 2010/0027109 A1, DE 10123027 B4, DE 10333326 B4 and US 2009/109416 A1.

DE 202017000475 U1 and the generic DE 102015200927 A1 make provision for the immersion medium to be injected in form of a liquid jet from an injection device laterally into the clearance between the microscope objective and for examining the sample by microscope. The solution described in DE 102015200927 A1 comprises an apparatus and a method for forming an immersion medium film between a sample carrier and the objective of a microscope, comprising an autoimmersion module for supplying the immersion medium from an immersion medium reservoir to a point of impact on the sample carrier or on the microscope displacement stage, consisting of an injection device, which is provided with a nozzle and is connected to a pump for generating a jet of immersion medium. As a result, a jet of immersion medium is sprayed at a defined speed onto a point of impact on the sample carrier or a point on the microscope displacement stage. Compared to the disadvantages of the solutions of the prior art mentioned at the beginning, in which technical equipment for performing the autoimmersion must be arranged at the objective or in the space close to the objective, DE 102015200927 A1 shows a solution that does not require a mechanical modification of the objective used and thus allows improved handling and continuous work with different objectives. In order to achieve this, the injection device must be arranged at such a distance from the objective that the objective changer can change the objective unhindered.

Prior art provides the injection device, which introduces the liquid immersion medium into the clearance between the microscope objective and the sample, rigidly adjusted, wherein the location is selected such that the change volume required for exchanging the microscope, for example for moving the old microscope objective out and moving a new microscope objective in, remains unobstructed. For this purpose, WO 2002/093232 A2 uses a clamping device, which is fastened by means of a screw near the objective and allows the injection device, in this case an outlet port of a feed pipe, to be clamped in optimal position. One problem is that air bubbles tend to form both in the jet itself and at the point of impact or in the nascent (first immersion) or already existing (replenishing-immersion) meniscus from immersion medium between the objective and the sample carrier. For microscopic applications, in particular for microscopic contrast methods (e.g. differential phase contrast, dark field contrast), air bubbles in the object field are absolutely unacceptable for reasons of image quality alone. In addition, air bubbles could give rise to microscopic malfunctions, e.g. in the autofocus system. In prior art, parameters to (e.g. flow velocity, jet diameter, jet characteristic) of discharge of the jet of immersion medium are therefore selected such that the required immersion liquid volume "arrives" free of air bubbles at the desired point of impact on the sample carrier and that no air bubbles form there. These parameters may require collecting devices at the objective, as is described, for example, in WO 2002/091232 A2.

SUMMARY OF THE INVENTION

Proceeding from this, the invention is based on the Object of avoiding the formation of air bubbles when the immersion medium is introduced.

The invention is characterized in the independent claims. The dependent claims relate to preferred developments.

A microscope that comprises a sample space for receiving, a sample and at least one microscope objective is provided. A motor-driven objective changer is provided for the microscope objective moving the new and/or old microscope objective through a change volume when the microscope objective is exchanged. The objective changer can be embodied, for example, as a known objective turret, which can swivel out the old microscope objective and swivel in the new one. The motor-driven objective changer is controlled by a control device to allow for an automatic objective change. An apparatus for applying a liquid immersion medium into a clearance between the microscope objective and a sample held in the sample space is furthermore provided. This apparatus for applying the liquid immersion medium comprises an injection device, which is configured to introduce, for example inject, the immersion medium in form of a jet laterally into the clearance. The injection device has an operating position, in which it occupies the change volume, it is furthermore coupled to a drive for adjusting its position. This drive is connected to the control device for control. In preparation for microscope objective change the control device is configured to control the drive such the injection device assumes a parking position, in which the injection device keeps clear from the change volume. The control device then controls the objective changer to exchanges the microscope objective. Then it controls the drive such that the injection device gets to the operating position, which in turn lies in the change volume.

In the method for applying a liquid immersion medium into a clearance between a microscope objective and a sample to be examined, the immersion medium is introduced, for example injected, in form of a jet laterally into the clearance by means of an injection device. Furthermore, to exchange microscope objective, a motor-driven objective changer, which moves the new and/or old microscope objective through a change volume of microscope objective change, is used. For the lateral introduction of the immersion medium into the clearance, the injection device is in an operating position in which it is located in the change volume. A drive for adjusting the location of the injection device is provided for the injection device. To exchange the microscope objective, the injection device is brought, by means of the drive, into a parking position in which the injection device keeps clear from the change space. The microscope objective is then exchanged by the objective changer. The injection device is then brought by the drive back into the operating position.

In this way, the operating position of the injection device can be optimally adjusted with regard to air bubble suppression and in particular does not have to be restricted with respect to an objective change being possible unhindered. Furthermore, the operating position is reached in a reproducible manner, that is to say it can be specified precisely to an optimum location, through the use of the drive, which is controlled by the control device. Said operating position is then reliably reached again after every objective change.

It has been shown that the closer the injection device is located to the clearance between the microscope objective and the sample, the easier it is to avoid air bubbles. Embodiments of the invention now make it possible to place the injection device very close to the clearance—closer than a microscope objective change would actually allow. Because of this close proximity to the clearance, complex measures that were necessary for air bubble suppression in the prior art can now be simpler, or they can even be dispensed with entirely. Where the state of the art makes provision, for example, for special immersion medium collecting devices that have to be mounted to the microscope so as to be able to implement a specific jet of immersion medium, such measures can now be omitted. This opens up simple retrofitting of existing microscopes with the injection device for automatic application of the immersion medium.

It is particularly preferred for the drive not only to set the relative location of the injection device but also its alignment, i.e. the discharge direction of the jet of immersion medium. This allows further optimization not only of jet length between injection device and clearance, but also of the angle at which the jet of immersion medium is introduced into the clearance.

Objective changers in the form of objective turrets have proven themselves in the field of microscopy. When using such objective changers, it is preferable if the drive is controlled or operated in such a way that it moves the injection device away from the clearance between microscope objective and sample when it is brought into the parked position and moves it toward the clearance when it is brought back into the operating position.

The conditions for applying the immersion medium can vary depending on the objective. A situation can therefore arise in which the operating position varies depending on the objective. It is therefore preferred that the operating position within the change volume is varied depending on the objective. This allows further optimization. In particular, one can adapt a specific front geometry of the objective, objective working distance and required immersion medium volume, type of immersion medium and its viscosity, which is different in the case of water, glycerol or mixtures or oil-containing immersions. The objective dependency can also take into account, in the case of an inverted or upright microscope, whether the jet of immersion medium contains a component counter to or in the direction of gravity. It is furthermore advantageous to adapt the operating position to conditions in the vicinity to the sample, for example in order to take into account an incubation of the sample or a space that is required for sample manipulation. A collision with or damage to such equipment is thus advantageously avoided.

In a further preferred embodiments, the control device or the method makes a distinction as to whether an immersion-free objective and an immersion objective are exchanged. When changing to an immersion-free objective, the injection device remains in the parking position. It is brought into the corresponding operating position only when an immersion objective is changed in.

In embodiments, the injection device comprises a nozzle which introduces the immersion medium into the clearance as a liquid jet, droplet jet, spray jet, steam jet or mist jet.

Insofar as aspects of the method are described below, this naturally also applies analogously to a corresponding configuration of the control device and vice versa.

It should be understood that the features specified above and the features yet to be explained below can be used not only in the combinations specified, but also in other combinations or on their own, without departing from the scope of the present invention.

BRIEF DESCRIPTION OF THE DRAWINGS

The invention will be explained in even more detail below on the basis of exemplary embodiments, with reference being made to the appended drawings, which likewise disclose features essential to the invention. These exemplary embodiments are only illustrative and should not be construed as restrictive. By way of example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times. In the figures.

DETAILED DESCRIPTION OF THE INVENTION

Figure 1:
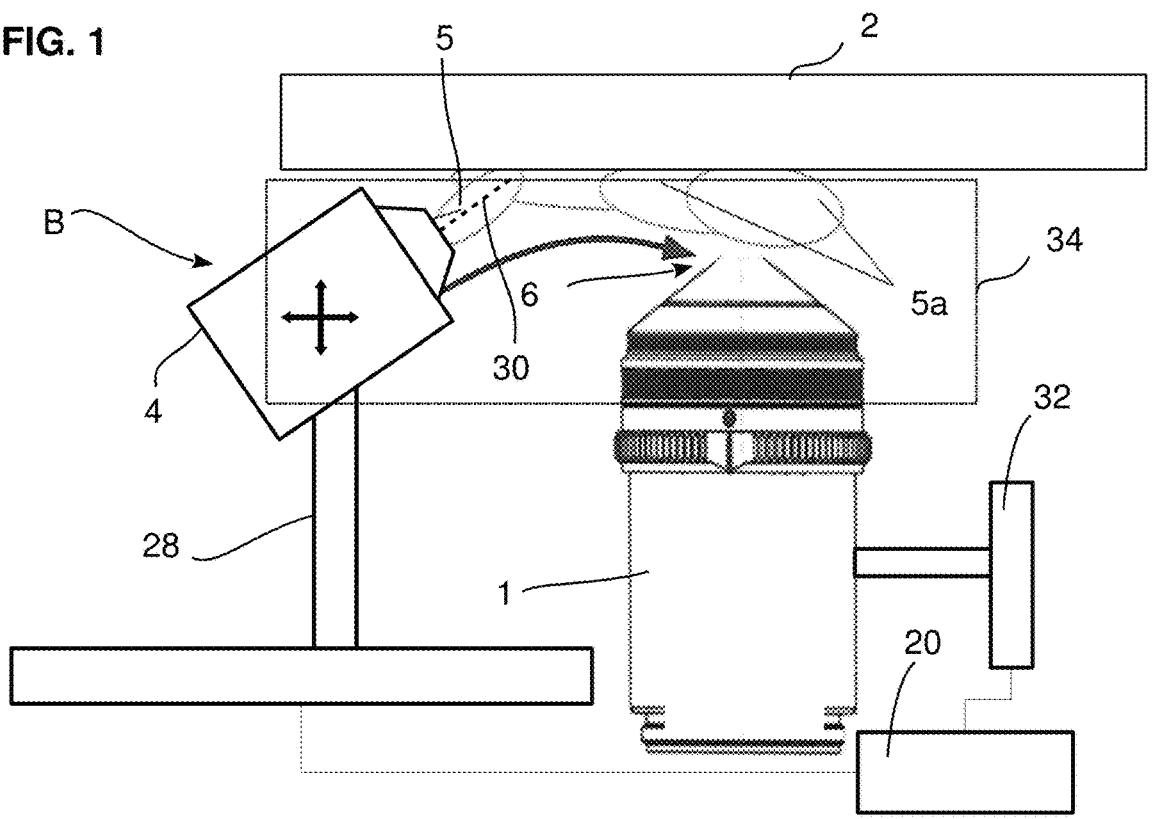
FIG. 1 shows an immersion device for first immersion by means of aa directed liquid jet, wherein an injection device is in an operating position.

FIG. 1 shows a first immersion at an objective 1 of an inverted microscope. For the sake of simplicity, FIG. 1 shows only structural components of the microscope in the vicinity of a clearance 6 between the objective 1 and a sample 2. The objective 1 is held by an objective changer 32, which is controlled by a control unit 20 and can exchange the objective 1 for another objective. To do this, the objective 1 and/or the new objective must be moved through a change volume 34. Consequently, no other structure may be present in this change volume 34, when the objective is changed, since otherwise a collision with the objective and/or the objective changer 32 would occur.

The microscope is embodied for immersion microscopy. This description refers to the case of water immersion as an example. The statements apply analogously to oil based immersion media. The Fig. shows immersion of the microscope 1 together with the sample carrier 2. For this purpose, a directed jet 5 emerges from a correspondingly designed nozzle 4, which introduces the immersion liquid along a jet axis 30 into the clearance 6 between the objective 1 and the sample 2. FIG. 1 shows a continuous water jet 5. This is a single-phase jet. The introduction of air bubbles during immersion must be strictly avoided.

The positioning of the nozzle 4 for applying the immersion medium is important for successful immersion, both in first immersion and in replenishing-immersion. If the nozzle 4 is located as close as possible to the region 2 that is to be examined, by microscope, the application of the immersion medium can thus be better concentrated in the region 2 to be examined. Air bubbles are then easier to avoid, too.

The embodiments of FIG. 1-4 therefore provide an adjustable nozzle 4, which can be spatially adjusted by a drive 28. The drive 28 is connected to the central control unit 20 of the microscope, which has already been explained. In a preferred design, the drive 28 adjusts the relative location of the nozzle 4 in two axes. In embodiments, however, it may also be sufficient to adjust the relative location of the nozzle along the jet axis 30, along which the jet is discharged into the clearance 6. In the case of a two-axis adjustment, it is possible to set not only the location along the jet axis 30, but also the point at which the jet axis 30 intersects the sample 2.

Figure 2:
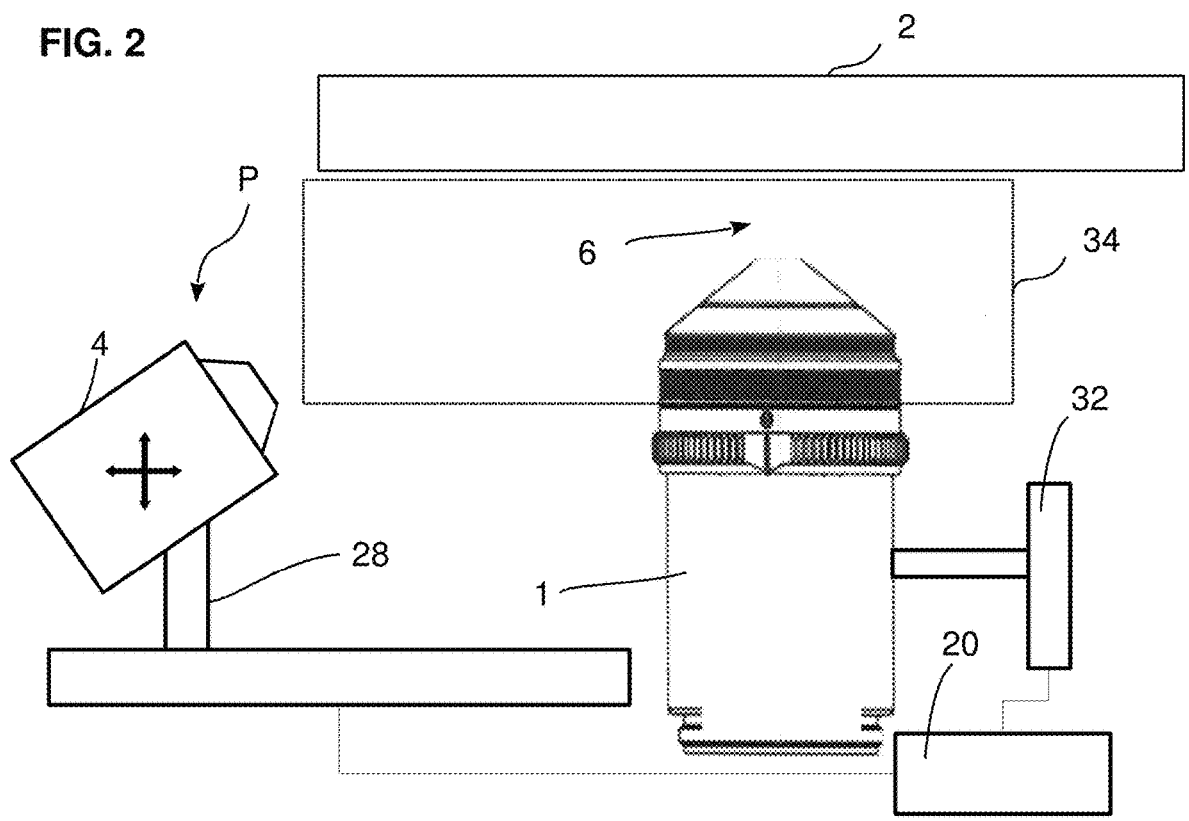
FIG. 2 shows the apparatus of figure wherein the injection device is in a parking position.

The control unit 20 synchronizes the drive of the objective changer 32 and the drive 28 for the nozzle 4 when the objective is changed. It actuates the drive 28 such that the nozzle 4 is brought into a parking position P, in which it keeps clear from the change volume 34, which means that the objective can be changed without collision between the objectives to be changed and/or between the objective changer 32 and the nozzle 4. This parking position P is shown in FIG. 2. When the nozzle 4 has reached the parking position P, the control unit 20 controls the objective changer 32 so that it exchanges the objective and another objective is brought into position, for example swivelled in by means of a turret. As FIGS. 1 and 2 show, the control unit 20 additionally controls the injection nozzle 4 such that, no jet 5 is discharged if outside the operating position B, in particular in the parking position P. The control unit 20 switches off discharge of the jet 5 from the nozzle 4 before the drive 28 moves the nozzle 4 out of the operating position B.

The control unit 20 then controls the drive 28 to move the nozzle 4 into the operating position B shown in FIG. 1, which is required for applying the immersion medium. This position lies in the change volume 34 and can therefore be freely selected even if a hindrance to exchanging the objective. In other words, there is greater freedom to choose the location of the nozzle 4, which is adjusted by the drive 28. The operating position B, i.e. the position and preferably also the alignment of the nozzle 4, are thus taken whenever no objective change takes place, with the result that the immersion medium can be optimally applied along the jet axis 30.

In embodiments, the operating position B can be optimized depending on the type of objective. The control unit 20 controls the drive 28 after an objective change to move the nozzle 4 from the parking position P, which was selected exclusively according to the criteria of the best possible space for objective change, into the operating position B, which is located in the change volume 34 and depends on the objective 1 that is currently used for the microscopy.

In this way, best possible application of the immersion medium is reconciled with a convenient and safe objective exchange. Both the position of the parking position P and the preferably objective-dependent operating position B of the drive 28 are stored in the control unit 20. They can optionally be set by a user, for example when a new objective is mounted to the objective changer 32 to be swivelled in or the like.

Figure 3:
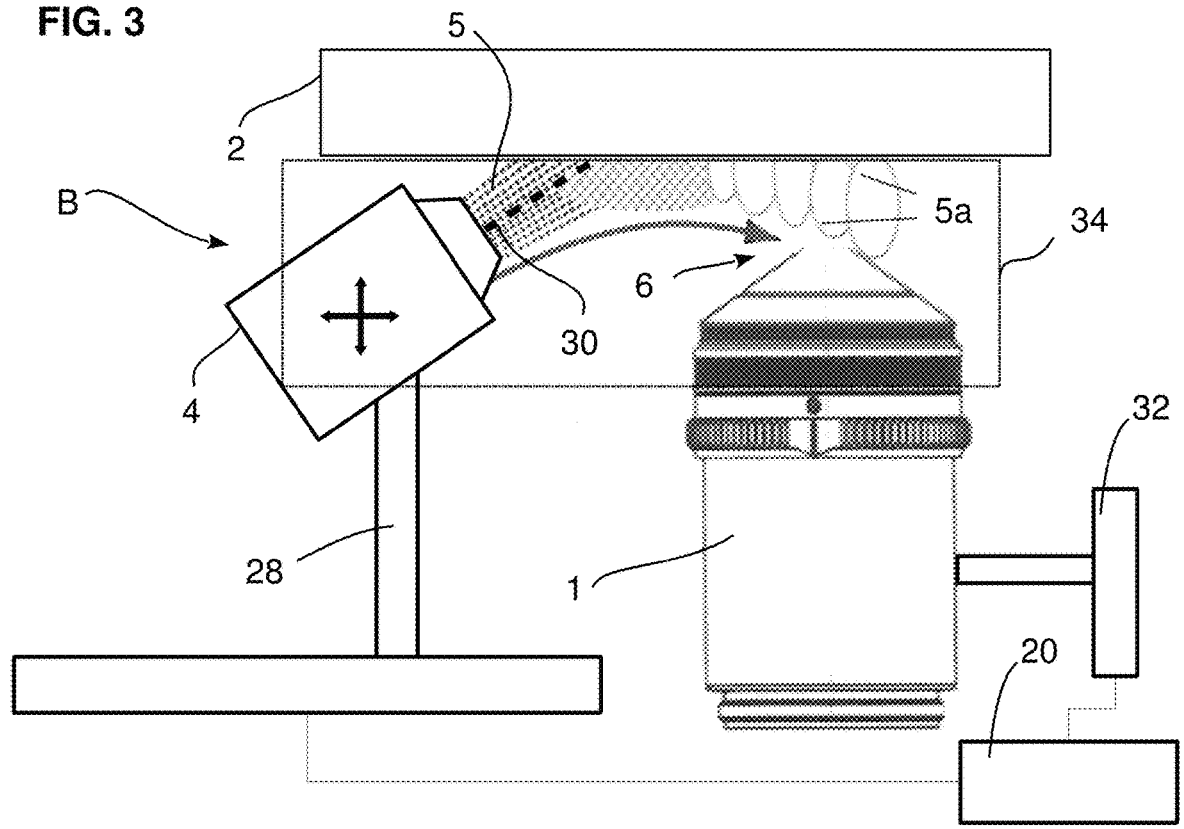
FIG. 3 shows an immersion device using a steam jet.

Synchronization between objective change and adjusting the location of the nozzle 4 can also be used in an embodiment shown in FIG. 3, in which the nozzle applies the liquid immersion medium in the form of a spray or steam jet 5, which is optionally supplemented in terms of range by a directed airflow that is emerging simultaneously from the nozzle 4. In this embodiment, the jet 5 supplies a two-phase mixture of immersion medium and air. The jet is directed into the clearance 6 between the objective 1 and the sample carrier 2. It moves over a distance of approximately 20-30 mm. When it arrives at the sample carrier 2, the immersion medium condenses out from the two-phase mixture, i.e. the spray or steam, and is deposited on the sample carrier in the form of droplets. Capillary forces pull the droplets 5a into the gap 6 between the objective 1 and the sample carrier 2. This results in a defined volume of immersion medium that wets the effective object field, the size of the volume depending on the specific working distance of the objective 1 and the object field diameter. Point of impact and intensity of the directed spray or steam jet 5 are selected such that formation of a meniscus in the clearance 6 between the objective 1 and the sample carrier 2 reliable and reproducible provides for immersion.

Figure 4:
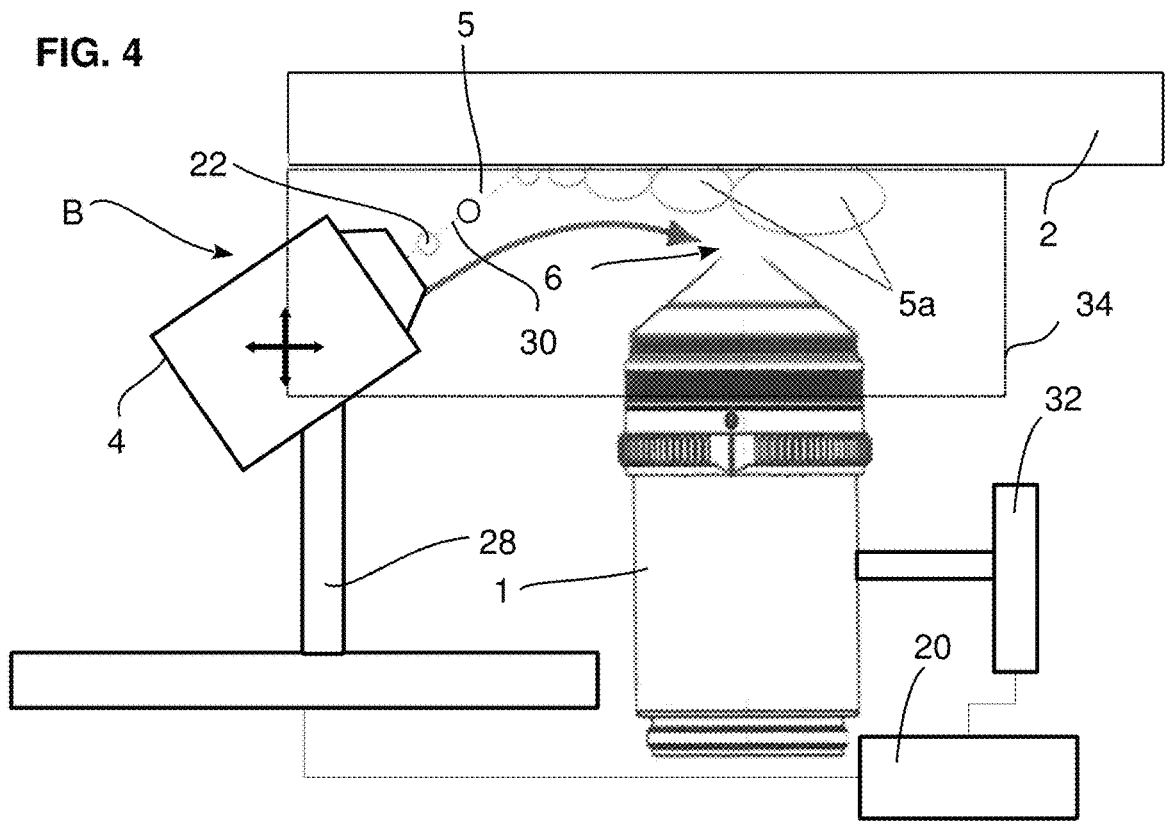
FIG. 4 shows an immersion device, which uses a jet of droplets.

In FIG. 4, a jet 5, which consists of a sequence of droplets 22, is applied from the nozzle 4.

Depending on the application, the immersion medium cart either be applied to generate a first immersion or to maintain an existing immersion (known as replenishing-immersion), which, under certain circumstances was generated manually conventionally. For the sake of simplicity, FIGS. 3 and 4 show only the operating position B. What was said about FIGS. 1 and 2 with regard to the parking position P and the switching-off of the jet 5 applies to all embodiments.

In the embodiment of FIGS. 1-4, the drive 28 is embodied such that the nozzle 4 can be adjusted along the jet axis 30. Preferably, a two-axis adjustment can additionally also be provided for such that the point of incidence of the jet axis 30 and/or the angle of incidence of the jet axis 30 relative to the clearance 6 can be adjusted. In the latter variant, the drive 28 adjusts inclination of the nozzle 4.

The invention claimed is:
1. A microscope, comprising
   a sample space;
   at least one microscope objective with a clearance being provided between a sample held in the sample space and the microscope objective;

a motor-driven objective changer, which moves the at least one microscope objective through a change volume when exchanging the microscope objective;

a control device controlling the objective changer; and an apparatus for applying a liquid immersion medium into the clearance, the apparatus comprising an injection device configured to introduce the immersion medium in the form of a jet laterally into the clearance when the injection device is in an operating position, wherein the injection device occupies the change volume when the injection device is in the operating position, the injection device is coupled to a drive for adjusting the location of the injection device, and the control device is connected to the drive, the control device being configured to:

control the drive to prepare for the microscope objective exchange;

move the injection device into a parked position in which the injection device keeps clear from the change volume while exchanging the microscope objective; and subsequently control the drive to move the injection device into the operating position.

2. The microscope as claimed in claim 1, wherein the drive is further configured to adjust an alignment of the injection device.

3. The microscope as claimed in claim 1, wherein the control device is configured to control the drive to move the injection device away from the clearance when moving the injection device into the parked position and to move the injection device toward the clearance when moving the injection device into the operating position.

4. The microscope as claimed in claim 1, wherein the operating position within the change volume is varied depending on the type of microscope objective.

5. The microscope as claimed in claim 1, wherein the injection device comprises a nozzle, for introducing the immersion medium into the clearance in form of a liquid jet, a droplet jet, a spray jet, a steam jet or a mist jet.

6. A method for applying a liquid immersion medium into a clearance existing between a microscope objective and a sample to be examined, the method comprising:

introducing the immersion medium in the form of a jet laterally into the clearance with an injection device, wherein the injection device assumes an operating position for laterally introducing the immersion medium into the clearance;

using a motor-driven objective changer for exchanging the microscope objective, wherein the objective changer moves the microscope objective through a change volume when exchanging the microscope objective and the injection device occupies the change volume when in the operating position, and wherein the method further comprises:

providing a drive for adjusting the location of the injection device;

moving the injection device (4) into a parked position using the drive;

clearing the change volume by moving the injection device;

changing the microscope objective with the objective changer; and subsequently moving the jet device into the operating position using the drive.

7. The method as claimed in claim 6, further comprising the step of varying the operating position in the change volume depending on type of the microscope objective.

8. The method as claimed in claim 6, further comprising the step of moving the injection device away from the clearance when moving the injection device into the parked position and moving the injection device toward the clearance to move the injection device into the operating position.

9. The method as claimed in claim 6, further comprising using the drive to align the injection device regarding an inclination of the jet.

10. The method as claimed in claim 6, further comprising introducing the jet into the clearance as a liquid jet, a droplet jet, a spray mist jet, a steam jet or a mist jet.

11. The microscope as claimed in claim 1, wherein the microscope is an inverted microscope.

12. The method as claimed in claim 6, further comprising the step of using an inverted microscope.

13. The microscope as claimed in claim 1, wherein the jet is one of the following: a droplet jet, a spray jet, a steam jet or a mist jet.

14. The method as claimed in claim 6, wherein the jet is one of the following: a droplet jet, a spray jet, a steam jet or a mist jet.

15. The microscope as claimed in claim 1, wherein the drive is configured to align the injection device regarding an inclination of the jet.

* * * * *

UNITED STATES PATENT AND TRADEMARK OFFICE
CERTIFICATE OF CORRECTION

| | | |
|---|---|---|
| PATENT NO. | : 12,061,330 B2 | Page 1 of 1 |
| APPLICATION NO. | : 17/288475 | |
| DATED | : August 13, 2024 | |
| INVENTOR(S) | : Johannes Knoblich et al. | |

It is certified that error appears in the above-identified patent and that said Letters Patent is hereby corrected as shown below:

In the Specification

In Column 2, please delete Line 38 and insert the following: --Proceeding from this, the invention is based on the object--

In Column 2, please delete Line 61 and insert the following: --volume. It is furthermore coupled to a drive for adjusting its--

In Column 4, please delete Line 55 and insert the following: --means of a directed liquid jet, therein an injection device--

In Column 4, please delete Line 57 and insert the following: --FIG. 2 shows the apparatus of figure 1 wherein the injection--

In Column 5, please delete Line 54 and insert the following: --additionally controls the injection nozzle 4 such that no jet--

In Column 6, please delete Line 23 and insert the following: --ment shown in Fig. 3, in which the nozzle applies the liquid-- and In Column 6, please delete Line 46 and insert the following: --Depending on the application, the immersion medium can--

Signed and Sealed this
Twenty-first Day of January, 2025

Coke Morgan Stewart
*Acting Director of the United States Patent and Trademark Office*